US 8,869,478 B2

(12) United States Patent
Gianolio (10) Patent No.: US 8,869,478 B2
(45) Date of Patent: Oct. 28, 2014

(54) MODULAR ROOF SYSTEM FOR A BUILDING

(75) Inventor: Giuseppe Gianolio, Cellarengo (IT)

(73) Assignee: Vass Technologies S.r.l., Carmagnola, Turin (IT)

( * ) Notice: Subject to any disclaimer, the term of this patent is extended or adjusted under 35 U.S.C. 154(b) by 0 days.

(21) Appl. No.: 13/505,223

(22) PCT Filed: Dec. 13, 2011

(86) PCT No.: PCT/IB2011/055646
§ 371 (c)(1),
(2), (4) Date: Apr. 30, 2012

(87) PCT Pub. No.: WO2012/101486
PCT Pub. Date: Aug. 2, 2012

(65) Prior Publication Data
US 2012/0324802 A1 Dec. 27, 2012

(30) Foreign Application Priority Data

Jan. 28, 2011 (IT) .............................. TO2011A0072

(51) Int. Cl.
| | | |
|---|---|---|
| *E04D 1/28* | (2006.01) | |
| *E04D 3/35* | (2006.01) | |
| *E04B 7/22* | (2006.01) | |
| *H01L 31/048* | (2014.01) | |

(52) U.S. Cl.
CPC . *E04B 7/22* (2013.01); *E04D 3/357* (2013.01); *E04D 3/358* (2013.01); *H01L 31/0482* (2013.01); *Y02E 10/50* (2013.01); *E04D 3/351* (2013.01); *Y02B 10/12* (2013.01); *Y02B 10/20* (2013.01)
USPC ........................................................ 52/302.4

(58) Field of Classification Search
USPC ............ 52/11, 302.1, 302.3, 302.4, 519, 533, 52/534, 539, 540, 542
See application file for complete search history.

(56) References Cited

U.S. PATENT DOCUMENTS 3,763,614 A * 10/1973 Hyde et al. .................... 52/309.9
4,651,494 A *  3/1987 Van Wagoner ............... 52/592.1
(Continued)

FOREIGN PATENT DOCUMENTS

DE   31 24 992 A1   1/1983
DE   41 00 796 A1   7/1992
(Continued)

OTHER PUBLICATIONS

International Search Report for corresponding International Patent Application No. PCT/IB2011/055646 mailed Jun. 28, 2012.
(Continued)

*Primary Examiner* — William Gilbert
*Assistant Examiner* — Kyle Walraed-Sullivan
(74) *Attorney, Agent, or Firm* — Merchant & Gould P.C.

(57) ABSTRACT

A modular roof system for a building and method for installing the modular roof system includes roofing modules (M) which are designed to be arranged alongside each other substantially with continuity on a supporting structure (C, T). Each roofing module (M) includes a supporting base (20; 120) which is designed to receive at least one functional element of the roofing and rests on the support structure (C, T) in an installation condition, and a top covering part (22; 122) supported on the base (20; 120). The base (20; 120) is shaped so as to define at least one free channel (26'; 126') extending substantially along a first direction of juxtaposition of the modules (M) and each roofing module (M) has interlocking members for joining together with adjacent modules (M) along at least one direction of juxtaposition of the modules (M).

14 Claims, 7 Drawing Sheets

(56) References Cited

U.S. PATENT DOCUMENTS

| | | | | |
|---|---|---|---|---|
| 5,159,791 | A | * | 11/1992 | Juhas ............................. 52/90.1 |
| 5,519,975 | A | * | 5/1996 | Taylor et al. .................... 52/533 |
| 6,546,687 | B2 | * | 4/2003 | Oh et al. ......................... 52/409 |
| 6,772,569 | B2 | * | 8/2004 | Bennett et al. ................ 52/592.1 |
| 8,028,483 | B2 | * | 10/2011 | Carolan ........................ 52/404.1 |
| 2002/0062621 | A1 | * | 5/2002 | Goettl et al. ................. 52/733.2 |
| 2008/0236058 | A1 | * | 10/2008 | Antonie ........................ 52/90.1 |
| 2008/0271399 | A1 | * | 11/2008 | Carolan ....................... 52/404.1 |
| 2010/0186305 | A1 | * | 7/2010 | Larimore ........................... 52/1 |

FOREIGN PATENT DOCUMENTS

| | | |
|---|---|---|
| EP | 1 071 138 A2 | 1/2001 |
| EP | 1 103 669 A2 | 5/2001 |
| JP | 10-219949 A | 8/1998 |

OTHER PUBLICATIONS

Written Opinion of the International Searching Authority for corresponding International Patent Application No. PCT/IB2011/055646 mailed Jun. 28, 2012.

* cited by examiner

MODULAR ROOF SYSTEM FOR A BUILDING

This application is a National Stage Application of PCT/IB2011/055646, filed 13 Dec. 2011, which claims benefit of Serial No. TO2011A000072, filed 28 Jan. 2011 in Italy and, which applications are incorporated herein by reference. To the extent appropriate, a claim of priority is made to each of the above disclosed applications.

BACKGROUND OF THE INVENTION

The present invention relates to the construction of the roof of a building.

The construction of roofs is typically performed directly on-site calling upon the services of various skilled labour at different times during construction of the building.

The simplest solution for a conventional pitched roof involves construction of the roof by means of the successive deposition of different layers: a supporting structure formed by the main beams or framework, a layer which acts as a mechanical structure (normally made of wood), a visible layer facing the inside of the building, for example made of wood (panelling) with an aesthetic value, an environmental insulation layer, and an outer layer for providing protection against atmospheric agents which is supported on the insulation layer by a batten arrangement. Typically, the insulation layer is protected from the moisture transmitted from inside the building by means of a vapour barrier and from the moisture from the external environment by means of a breathable sheath.

This solution, although effective from a technical point of view, has drawbacks associated with the high costs for coordination and execution of the activities and the high dependency on weather conditions during the construction work; it also poses major risks for the persons working on-site since most of the construction work involves operations performed directly on the roof.

Moreover, a conventional pitched roof is characterized by the fact that the potential of the roof is not fully exploited. The roof of a building in fact usually performs the sole function of providing protection against atmospheric agents. It is well known, however, to install service systems on the roof of a building, for example telecommunications antennae, and increasingly more frequently the free surfaces of roofs are used for installing solar or photovoltaic panels for the production of hot water and electric energy. These systems and other devices which are able to make use of the surface of the roof in order to perform a function other than a protective function (for example, perimetral alarm systems, windows or similar light openings, ventilation systems) are installed by means of operations which are performed after construction of the roof at different moments in time and with significant additional costs, these costs being due mainly to the fact that the conventional method for construction of the roof does not envisage the use of such systems already during the design phase and the fact that large-area installations must be removed in the event of renovation of the underlying roofing.

In addition to these problems of a general nature, the various functions added to the roof of the building are subject to particular requirements and specific limitations. For example, in the areas underneath the roof (which may also be living areas, such as an attic), often it is not easy to provide efficient and uniform artificial lighting. In fact, since it is not possible to reach every desired lighting point by laying conductors inside masonry walls, either a lighting system with a simple layout is provided, this usually running along the support beam and resulting in lighting of the premises which is not uniformly distributed, or a distributed lighting system is provided (for example using spot lamps), where, however, in order to avoid the unattractive effect of visible electric cables, the latter must be laid above the visible aesthetic finish of the ceiling, with obvious difficulties and the need for subsequent work on the roof.

SUMMARY OF THE INVENTION

The object of the present invention is therefore to provide a satisfactory solution to the problems described above, overcoming the drawbacks of the prior art.

In particular, the object of the invention is to provide a constructional roofing solution for buildings which can be implemented in a simple manner and ensures greater safety during execution.

A further object of the invention is to provide a constructional roofing solution for buildings which facilitates the installation, on the surface of the roof, of systems and devices which are able to perform a function in addition to a protective function.

The invention relates furthermore to a method for configuring a modular roof system and a method for installing a modular roof system, as claimed.

In brief, the present invention is based on the principle of constructing the roof of a building by means of installation of roofing modules which are preassembled in an industrial environment (prefabricated).

The preassembled modules are modules performing only a covering function or roofing modules which incorporate directly further functions predefined during the design stage and which make use of the associated surface in order to provide functions other than a simple covering and protective function (for example the production of electric energy by photovoltaic means, illumination, sensor system, ventilation).

The roof of a building may be constructed using exclusively preassembled modules which have only a covering function, or using functionally designed modules which replace partially or entirely the modules having just a covering function. The modules are joined together by means of joining elements which ensure the distribution of functions among adjacent functionally designed modules. In particular, a service duct arranged between pairs of adjacent modules and consisting of a channel formed laterally in one of the modules or in both of them allows electric, hydraulic or other kinds of connections to be laid between the functionally designed modules.

Special terminal or "end-of-roof" modules are provided for constructing the ridge of the roof, the lower edge and the side edge of the roof.

The preassembled modules are constructed with a structure which allows the necessary insulating and covering functions to be performed and facilitates joining together of juxtaposed modules and are fixed on-site onto an existing supporting structure. In a first embodiment the modules are constructed with a "box-like" structure comprising a housing recess designed to receive at least one functional element of said roofing. In a second embodiment the modules are constructed with a block-like structure, comprising a bottom platform and a top environmental insulation block designed to receive at least one functional element of said roofing.

Advantageously, the preassembled modules may be constructed beforehand so as to have a desired aesthetic appearance, chosen in accordance with their intended position, both as regards the areas inside the building (e.g. habitable attic) and as regards the external roofing, the appearance of which is generally associated with typical local geographic features (tiled roofs, stone slate roofs, etc.).

The modules have preferably a standard size and, during a step for designing and configuring the roof of a building being constructed (or renovated) using the technique according to the invention, preferably, but not necessarily, performed by a computer program, the optimum dimensions of the roof are defined as whole multiples of the standard dimensions of the preassembled modules.

The method for installing a roof constructed according to the invention includes the laying and fixing of preassembled roofing modules and preassembled functional roofing modules to the supporting structure on-site in a predetermined arrangement, as well as a subsequent test procedure for checking the perfect construction of the roof, both as regards environmental insulation and protection from atmospheric agents (for example, hydraulic sealing action) and as regards the functional aspects (for example checking the continuity of the electrical and hydraulic connections).

Advantageously, the modular roof system according to the invention is particularly effective for single-pitch and double-pitch roofs.

BRIEF DESCRIPTION OF THE DRAWINGS

Further characteristic features and advantages of the invention will be explained more clearly in the following detailed description of an embodiment thereof, provided by way of a non-limiting example, with reference to the accompanying drawings in which.

DETAILED DESCRIPTION OF THE PREFERRED EMBODIMENTS

Figure 1:
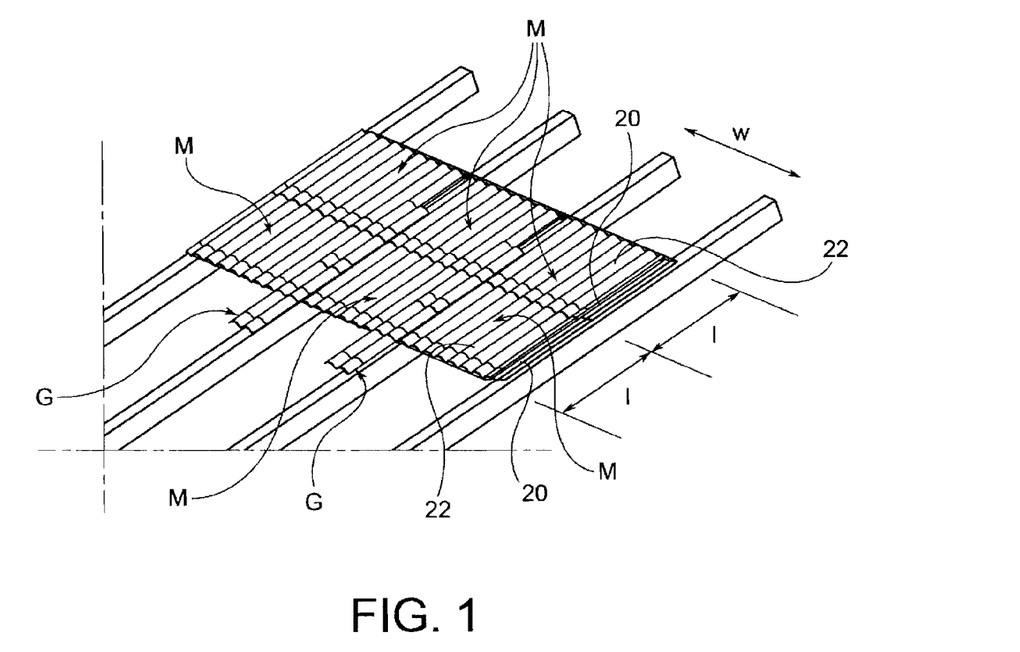
FIG. 1 is a drawing showing a modular roof system according to the invention.

A modular roof system according to the invention, shown in FIG. 1, comprises a plurality of roofing modules M, each of which has a support base 20 with, in a first embodiment, a general box-like form, an internal insulation layer and a top part 22 intended to be exposed to the external environment or to support an additional covering, these parts being assembled to form a multilayer block of predetermined width w and length 1.

Advantageously, each single module M has a width w equal to the distance between the beams of the supporting structure of the roof (conventionally 0.80-1.3 m) and a length 1 of about 50-80 cm, reaching an overall weight of between about 10 kg for a simple roofing module and about 30 kg for a functionally designed module, which will be described below, said features making the module according to the invention easy to handle by a workman on-site. However, without departing from the spirit of the invention, it is also possible to provide multiple-size modules, for example with a width equal to that of the single module, but with double the length, resulting in shorter laying times, or with double the length and width for housing the functionally designed devices.

Figure 2:
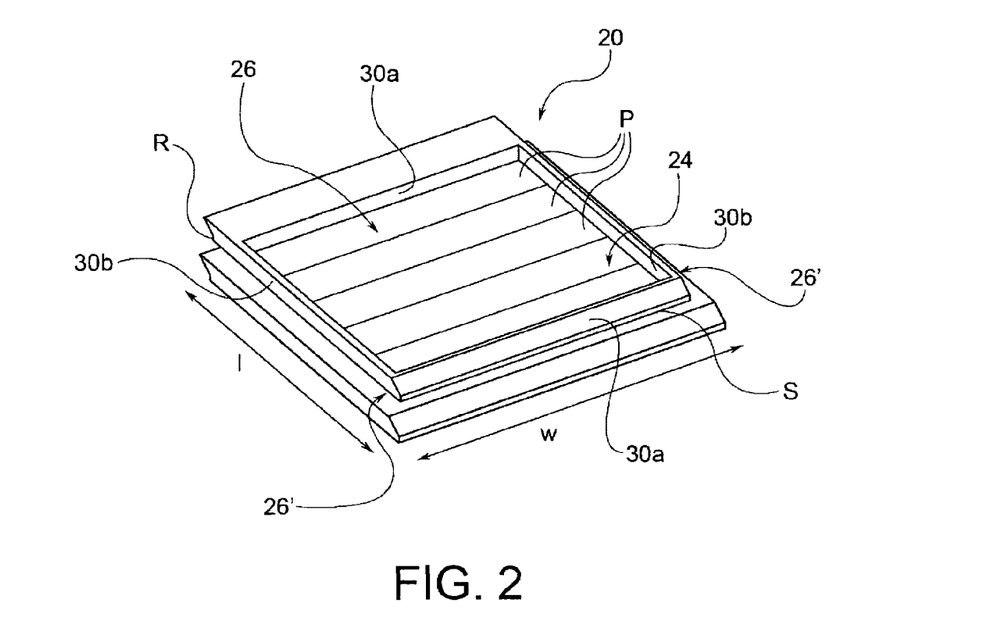
FIG. 2 is a drawing showing a support base of a roofing module of the modular roof system according to FIG. 1, in a first embodiment.

According to a first embodiment shown in FIG. 2, the support base 20 of the module has a bottom platform or wall 24 over an area of which a housing space 26 designed to receive structural or functional elements of the roofing is defined. Advantageously, the bottom wall 24 is formed by a single panel or by means of juxtaposition of commercially available laths P which can be joined together in an interlocking manner along the length of the module. Said wall is preferably made of wood or alternatively of a material which is suitable for plastering.

In the currently preferred embodiment, the support base 20 has a housing recess 26 which is bounded perimetrally at least partially by shoulder elements or side walls 30 which project from the bottom wall with a predefined inclination, providing the module with a substantial box-like form. The bottom wall 24 is designed to rest on the beams of the roof supporting structure in an installed condition and if necessary is intended to be exposed visibly on the inside of the building. The lateral shoulder elements 30 are instead designed to support the top part 22 of the module.

In one variation of embodiment the lateral shoulder elements 30 comprise horizontal lateral elements 30a which are arranged along the sides of the base 20 widthwise, or parallel to the ridge and to the gutter and orthogonal to the lateral fascias in the installation condition, and vertical lateral elements 30b, which are arranged at a predetermined distance from the sides of the base 20 along its length, or parallel to the lateral fascias and orthogonal to the ridge and the gutter.

The horizontal lateral elements 30a also have the function of means for joining together vertically adjacent modules and are arranged along a plane which is inclined with respect to the bottom wall, forming together with the bottom wall an angle for example of 45°, or along a plane orthogonal to the bottom wall 30.

Figure 3:
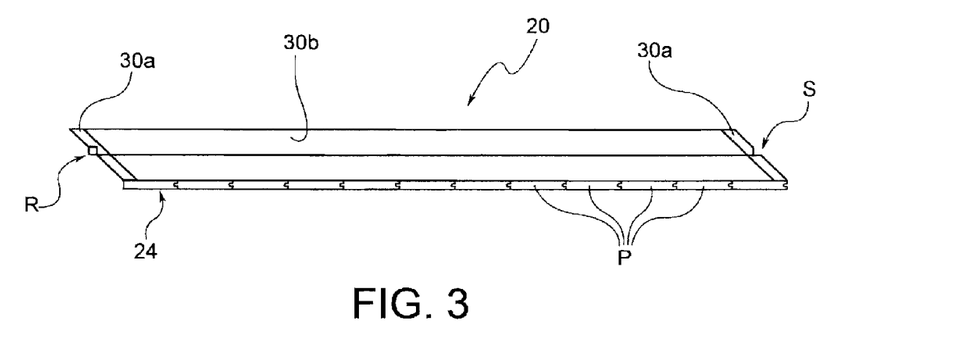
FIG. 3 is a side view of a support base of the module according to FIG. 2, in a first variation of embodiment.

If the horizontal lateral elements 30a are inclined, as shown in FIG. 3, the outer side of the front horizontal element of the module is provided with a groove S having a shape corresponding to a projection R formed on the outer side of the rear horizontal element of the adjacent module, so as to have a mechanical interlocking function. The groove may be lined, if required, with a seal which is made of rubber or similar resilient material, of corresponding shape, intended to compensate for thermal expansion and prevent the passage of air between the modules when joined together, ensuring that they remain in contact even when there are major fluctuations in the temperature of the environment, and intended to maintain a suitable overall transmittance of the roofing.

Figure 4:
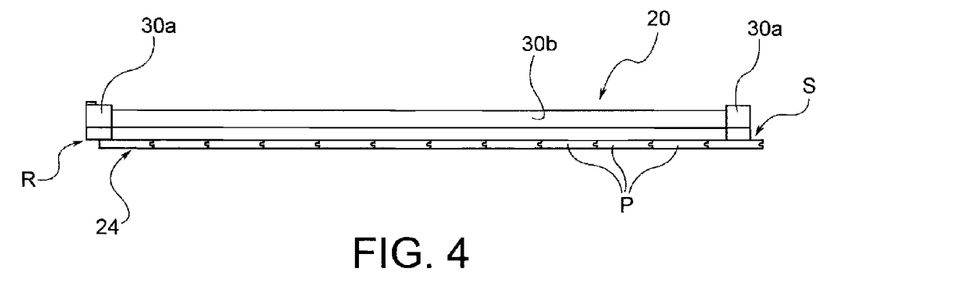
FIG. 4 is a side view of a support base of the module according to FIG. 2, in a second variation of embodiment.

In the case where the horizontal lateral elements 30a are instead orthogonal, as shown in FIG. 4, mechanical interlocking between the modules when joined together is performed by means of relative staggering of the side of the bottom wall and the horizontal lateral element arranged on top of it. This offset arrangement also gives rise in this case to a broken-line profile which has the same effect as the groove formed in the inclined lateral elements. As in the case above, the outer profile of the horizontal lateral element may be lined with a seal made of rubber or similar resilient material, of corresponding shape, intended to compensate for heat expansion and prevent the passage of air between the modules when joined together, ensuring that they remain in contact even when there are major fluctuations in the temperature of the environment, and intended to maintain a suitable overall transmittance of the roofing.

The vertical lateral elements 30b are arranged along a plane perpendicular to the bottom wall 24 and have a profile which is rectangular or in the form of a parallelogram which depends on the angle which the horizontal lateral elements 30a form with the bottom wall. The vertical lateral elements 30b are arranged at a predetermined distance from the edge of the base 20, so that they define on the outside of the housing recess 26 a free channel 26', the function of which will be clarified more fully in the continuation of the present description.

Both the lateral elements 30a and 30b are preferably made of wood and fixed to the bottom wall of the base by means of nailing, screwing or gluing.

Figure 5:
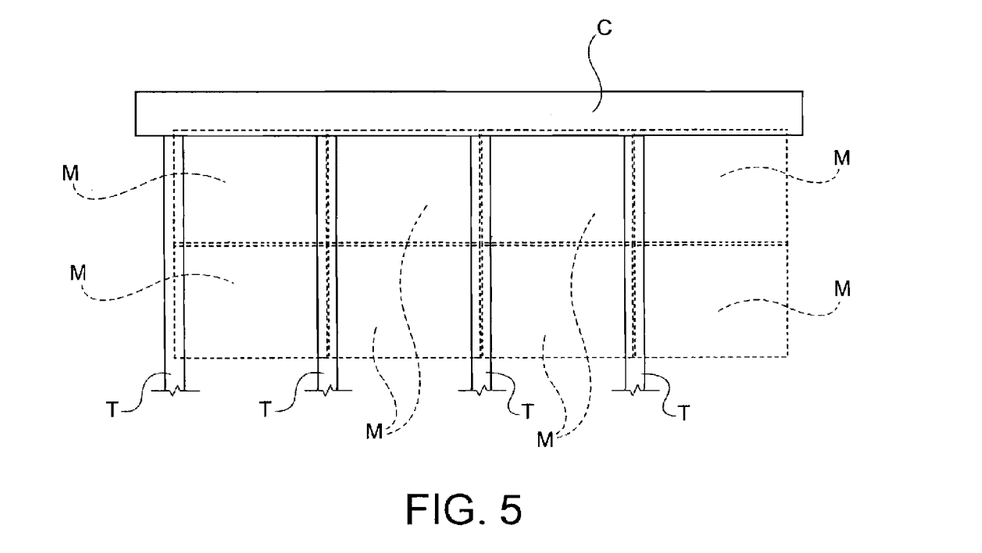
FIG. 5 is a diagram illustrating by way of example the arrangement for installation of roofing modules according to the invention on a roof supporting structure of a building.

A view showing by way of example installation of the roofing modules M according to the invention on a supporting structure of a roof comprising a ridge support beam C and structural beams or struts T is illustrated in FIG. 5, which shows the arrangement of the support bases of the roofing modules M resting on the structural beams T, the structural distance of which coincides with the width w of the module base.

Joining together of adjacent modules in the vertical direction, i.e. in the direction from the ridge to the gutter of the roof, is performed by means of an interlocking fit of a front horizontal lateral element of an upstream module together with a rear horizontal lateral element of the downstream module, resulting in structural continuity between the recesses housing structural or functional elements of the single modules.

Joining together, by means of juxtaposition, of the roofing modules in the horizontal direction, namely in the direction between the lateral fascias of the roof, results in the side-by-side arrangement of the free channels 26' defined along the sides of the housing recess 26, so as to form a free space 40 between the two facing vertical lateral elements 30b of two adjacent modules which is bounded by the bottom wall 24 of the support bases of the modules and which in the description below will be referred to by the term "service duct".

The service duct 40 extends along the length of the modules, namely in a direction parallel to the lateral fascias and perpendicular to the ridge and gutter, on the outside of the recess 26 housing the insulation layer or functional elements of each module.

The recess in the support base 20 houses an insulation layer, with a thickness and made of a material suitable for the insulation class required for roofing, which is arranged on the bottom wall 24. The insulation layer comprises, for example, a solid insulating panel which is cut to shape with dimensions compatible with the dimensions of the recess formed in the module, or a non-solid insulating material (chipboard, wood cellulose fibres or expanded polysterene) confined between the lateral shoulder elements 30 of the recess.

In addition to the insulation layer described above, the module may be completed by other additional components providing protection against the atmospheric agents (rainfall, moisture, wind) such as impermeable canvas layers arranged on top of the insulation layer or lateral seals on the outside or inside of the recess in the support base. Advantageously, it is envisaged providing a "vapour barrier" layer or a "vapour stop" layer which is glued onto the upper side of the bottom wall, with the function of protecting the insulation layer from the moisture rising inside the building. The vapour barrier layer or vapour stop layer has dimensions greater than those of the bottom wall widthwise, with one of the two extra long sections being optionally provided with preassembled double-sided tape so that fixing together of adjacent modules can be performed more rapidly on-site. It is envisaged also providing a "sheathing" layer which is glued onto the top side of the insulation layer and onto the top side of the lateral elements 30 of the box-like structure so as to protect the insulation layer and the bottom part of the module from moisture and from the adverse weather conditions of the external environment. The sheathing has, in the vertical direction, dimensions which are greater than those of the support base, having an extra long section towards the front side of the module (facing the gutter) so that, during installation, it may overlap the sheathing of the adjacent module, in accordance with the assembly procedure which envisages the laying of modules starting from the gutter up to the ridge. Laterally the sheathing has portions extended, with respect to the dimension of the support base, in both directions, on one side by an amount sufficient to cover the entire service duct space, one of the two extended portions being optionally provided with preassembled double-sided tape so that fixing together of adjacent modules on-site may be performed more rapidly.

When laying a panel-like insulating layer, which does not require a confining cage, the recess in the support base may be only partially bounded by lateral elements 30 provided that the resultant overall structure is able to withstand in all cases walking on the roof.

Figure 6:
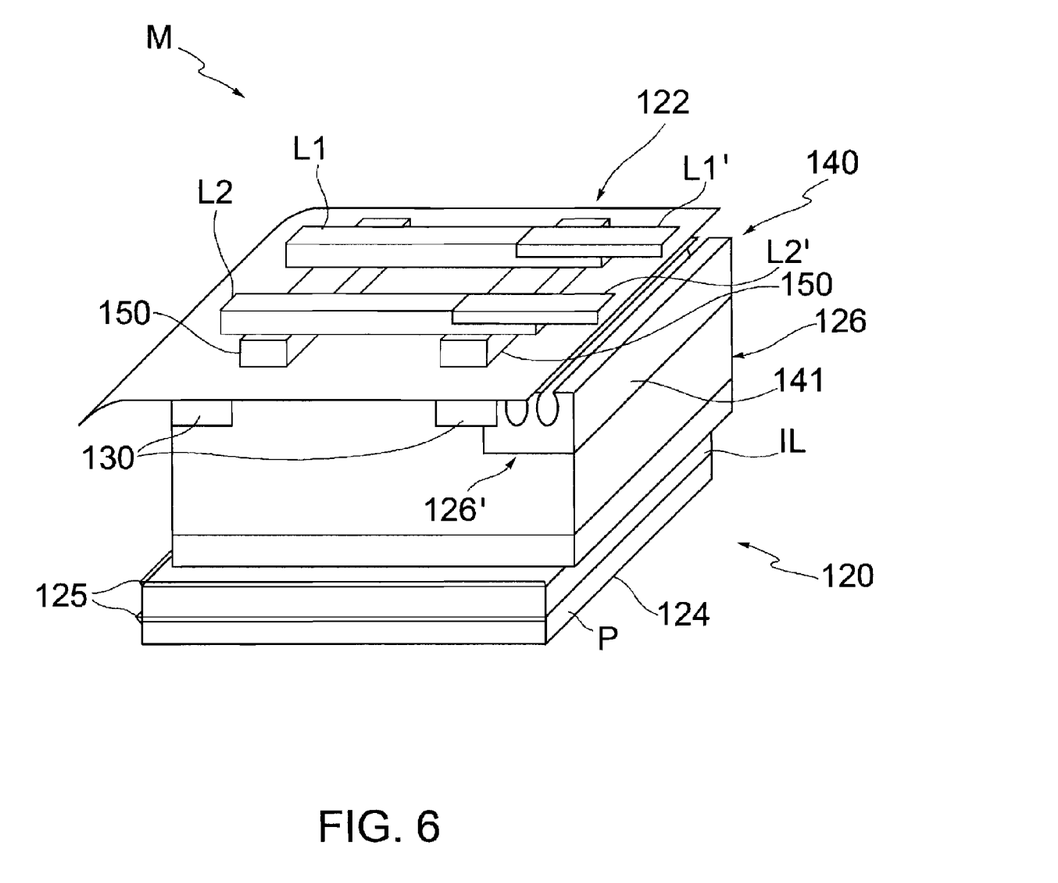
FIG. 6 is a drawing showing a roofing module of the modular roof system according to FIG. 1, in a second embodiment.

With reference to FIG. 6, a second alternative embodiment is described.

The support base 120 of the module has a bottom platform 124 over an area of which a top environmental insulation block 126 able to receive structural or functional elements of the roofing is arranged in an offset position.

Advantageously, the bottom platform 124 is formed as a multilayer arrangement comprising a panel P, which is preferably made of wood, optionally composed of a plurality of commercially available laths which can be joined together in an interlocking manner along the length of the module, and a layer IL of insulating material, for example polystyrene.

In the currently preferred embodiment the insulation block is a block of wood fibre, cork or similar material which has heat-insulating properties, optionally reinforced with a substrate formed by a wood chipboard panel which may be surrounded laterally by a perimetral, high-strength, retaining sheet made of paper, for example paper obtained by means of a Kraft process, and is fixed to the platform during manufacture by means of nailing, screwing or gluing, and even more preferably by releasable fastening means so as to allow easy removal of the structure in the event of maintenance operations or the fitting of new installations on the roof.

The bottom platform 124 of the base is designed to rest on the beams of the roof supporting structure in an installed condition and if necessary is intended to be exposed visibly on the inside of the building.

The top environmental insulation block 126 is shaped so as to define a free channel 126' able to be connected with continuity to corresponding channels defined in adjacent modules along a predetermined roof covering direction so as to form a continuous single service channel extending over the entire extension of the roof pitch.

The insulation block 126 has an offset arrangement with respect to the bottom platform 124 which defines the means for forming an interlocking joint between vertically and horizontally adjacent modules M. In particular, the insulation block 126 projects relative to the bottom platform 124 on two adjacent sides of the module along a first and a second orthogonal direction of juxtaposition of the modules. The joining together of adjacent modules in both the horizontal and vertical directions is performed by means of insertion of the platform 124 of one module underneath the insulation block 126 of two first adjacent modules along both the directions of juxtaposition, and by arranging the insulation block 126 of the same module over the platform 124 of two second modules adjacent in both directions of juxtaposition of the modules, resulting in structural continuity between the platforms and the insulation blocks of the single modules.

The base platform 124, on at least two sides of the module, has along the flanks and on the upper face respective seals 125 which are made of rubber or similar resilient material and extend along the length of the respective side and which may be seated inside a groove provided for this purpose and which can be compressed in a juxtaposed condition of two adjacent modules and in this condition are able to form an interspace having an additional heat insulation function between blocks.

In addition to the insulation layer 126 described above, the module may be completed by other additional components providing protection against the atmospheric agents (rainfall, moisture, wind), as described above with reference to the first embodiment. In particular, a "sheathing" layer arranged on the upper face of the insulation block for protecting the lower part of the module from moisture and from the adverse weather conditions of the external environment has, in both directions, dimensions which are greater than those of the insulation block so that, during installation, it may overlap the sheathing of adjacent modules, in accordance with the assembly procedure, being arranged also over the service duct.

Also with regard to this embodiment FIG. 5 shows a view by way of an example of installation of the roofing modules M on a supporting structure of a roof.

At the top, the insulation block 126 has a pair of upper shoulder battens 130 which are designed to support the top covering part 122 of the module and optionally at least one functional element of said covering. The joining together, by means of juxtapositioning, of the covering modules in the vertical direction, namely in the direction between ridge and gutter, results in adjacent arrangement of the free channels 126' defined inside the shape of the insulating block, between two shoulder battens 130 of two horizontally adjacent modules, forming a service duct 140. Each shoulder batten 130 is designed to define a respective service duct 140 when cooperating with a lateral batten of an adjacent module.

The top part 22, 122 of the roofing module M closes the recess in the support base according to the first embodiment or is positioned above the insulation block according to the second embodiment and performs the covering function (in a variant it is the part which is exposed to atmospheric agents) and any other active functions of the module (i.e., additional functions other than just a covering function, such as production of photovoltaic energy, illumination, sensing system).

Figure 7:
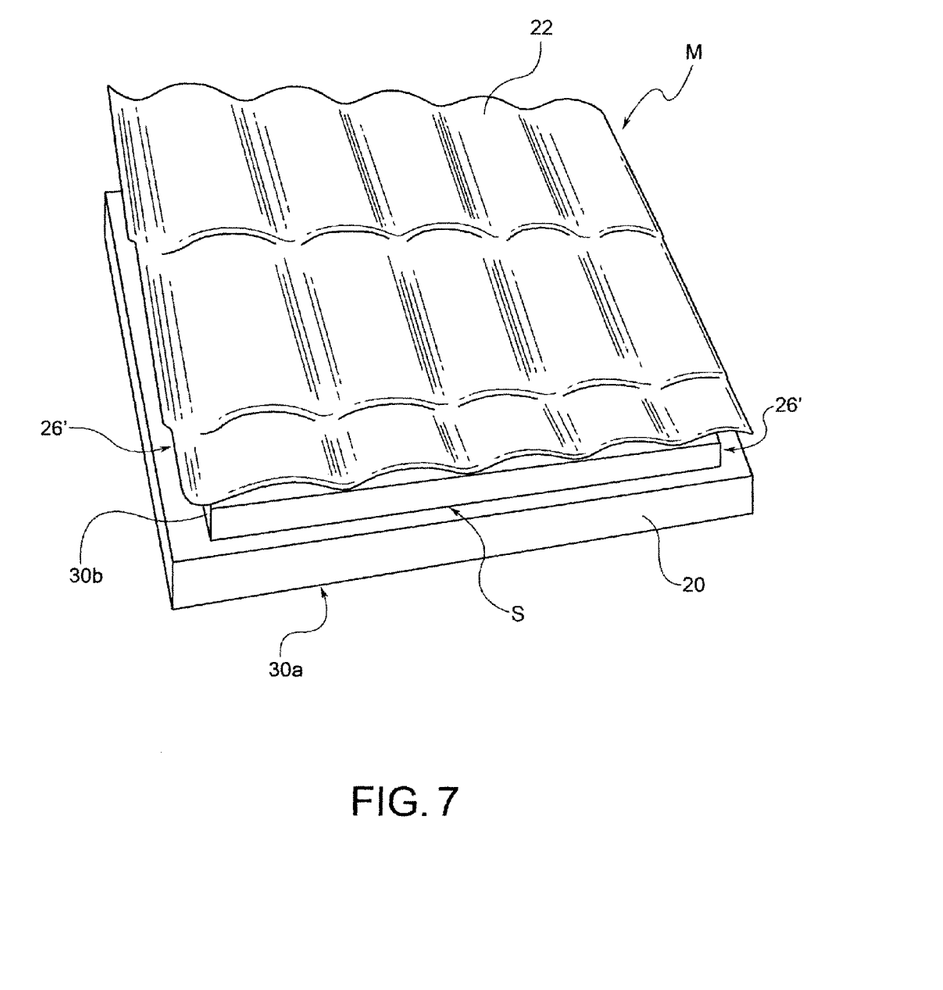
FIG. 7 is a view illustrating by way of example a first embodiment of the top part of the module according to the invention.

In a roofing module M, the top part 22, 122 which has the function of simply providing protection against atmospheric agents may be made as a non-functionally tile-shaped covering sheet which is directly visible externally, as shown in FIG. 7 with reference purely by way of example to the first embodiment, with an aesthetic effect similar to that of conventional solutions. The covering may be made using plastic materials, clay materials, aluminium or other metals or alloys and is fixed beforehand at the factory (for example by means of nailing or fixing using a bolt/washer system) onto the support base.

Alternatively, the top part 22, 122 of the roofing module may be made as a non-functional, corrugated, undertile covering sheet onto which the conventional tiles may be laid on-site and which is fixed beforehand onto the support base at the factory (for example by means of nailing or fixing using a bolt/washer system).

According to a further alternative, the top part 22, 122 of the roofing module may be made as a non-functional cover with tile-holder battens L onto which the tiles or stone slates may be laid on-site and which is fixed beforehand onto the support base at the factory (for example by means of nailing or fixing using a bolt/washer system).

Figure 8:
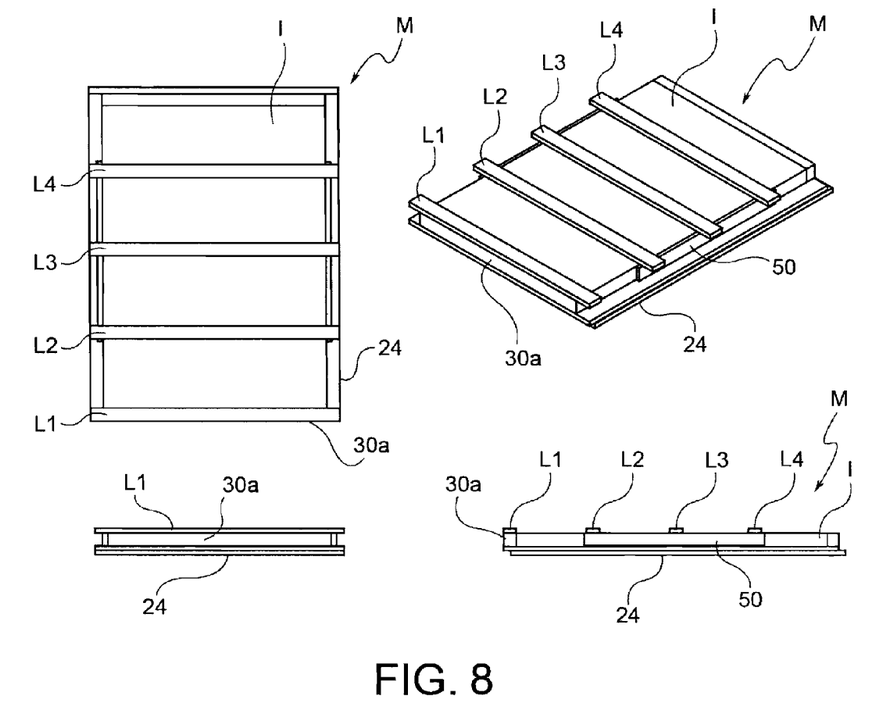
FIG. 8 is a set of views illustrating by way of example a second embodiment of the top part of the modules according to the invention.

The top part with tile-holder battens L, which is shown for example in FIG. 8 with reference purely by way of example to the first embodiment and in the same FIG. 6 with reference to the second embodiment, includes a plurality of horizontal battens L1, L2, . . . , preferably made of wood, which are spaced depending on the dimensions of the commercially most popular tile models and are designed to support the tiles or similar roofing articles, as usually occurs with battens of conventional roofs.

In detail, FIG. 8 shows a module M with a double length having the structure of an open box, which is bounded only by a horizontal shoulder element 30a which is arranged at 90° with respect to the bottom wall of the support base and onto which a panel-like insulation layer I is placed. In the example according to the figure, the module is shown, from left to right and from top to bottom, in a top plan view, perspective view, a front view and a side view. Only the first tile-holder batten L1 rests on the bottom wall 24, while the second, third and fourth battens L2, L3, L4 rest on side shoulders 50 so as to accommodate, underneath them, a single panel of insulating material I which is retained against the first batten L1. By way of an alternative, not shown here, in order to increase the structural strength, the second, third and fourth tile-holder battens L2, L3, L4 may also rest on the bottom wall of the support base, and small-size insulating panels, substantially in the form of horizontal strips, may be housed in the spaces defined between the battens L1, L2, between the battens L2, L3 and between the battens L3 and L4 and behind the batten L4.

In detail, with reference to the second embodiment, FIG. 6 shows a module M with an insulation block structure provided with a pair of wooden tile-holder battens L1, L2 and associated metal connecting extensions L1', L2' which rest on side shoulders 150 and perform the function of joining elements for adjacent modules.

By way of an alternative to the simple covering function, the support base 20, 120 or the top part 22, 122 of the module M may include one or more incorporated functional elements which perform, together with the module structure, the covering function.

These functional elements include, without being limited thereto:
photovoltaic panels for generating electric energy from sunlight: the top part of the module M is formed entirely or partially by a photovoltaic panel which forms an integral part of the module itself, the electric cables for connecting the panel to the electrical network of the building being housed inside the recess 26 in the support base, or, in the second example of embodiment, in a similar space between the panel and the sheathing layer and between the shoulder pieces 150, from where they are routed into the service duct 40 and from here conveyed inside the building;

solar/thermal water heating panels: the top part of the module M consists entirely or partly of a thermal solar panel which forms an integral part of the module itself, the hydraulic lines of the panel being housed inside the recess 26 or similar space in the support base from where they are routed into the service duct 40 and from here conveyed inside the building;

roofing element with telecommunications components: the top part of the module M houses entirely or partially, directly incorporated in the module itself, the telecommunications components (for example TV program receiver antennae), the electrical connection cables being housed inside the recess 26 or similar space in the support base from where they are routed into the service duct 40 and from here conveyed inside the building;

roofing element with surveillance sensors: the top part of the module M houses entirely or partially, directly incorporated in the module itself, the surveillance elements (for example anti-intrusion sensors, surveillance video cameras, acoustic warning devices and lighting devices), the electrical connection cables being housed inside the recess 26 or similar space in the support base from where they are routed into the service duct 40 and from here conveyed inside the building;

roofing element with direct light inlets: the module M incorporates a closed glass pane or a window which can be opened inside the recess 26 or similar space in the support base and which allows the direct passage of the sunlight and ventilation, where required, of the area underneath the roof;

roofing element with light sources inside the building: the module M incorporates inside the recess 26 or similar space of the support base and through the bottom wall 24 lamps or similar lighting devices, the electric cables for connection to the electric power supply network being housed inside the recess 26 in the support base from where they are routed into the service duct 40 and from here conveyed inside the building;

roofing element with incorporated weather station: the top part of the module M houses entirely or partially, directly incorporated in the module itself, the weather station components (for example temperature and moisture detection instruments, rainfall gauges), the electrical connection cables being housed inside the recess 26 or similar space in the support base from where they are routed into the service duct 40 and from here conveyed inside the building;

roofing element with natural air conditioning system: the module M incorporates inside the recess 26 or similar space in the support base a ventilation system which allows the natural circulation of air through the module, between the outside and inside of the building, which can be activated selectively for example in an automatic manner when the temperature and weather conditions detected outside the building are more favourable than those detected inside the building; the module has proved to be advantageous for improving the environmental conditions of the area underneath the roof without having to use forced air conditioning components;

roofing element with audio system inside the building: the module M incorporates inside the recess 26 or similar space in the support base and through the bottom wall 24 sound diffusion devices, the electric cables for connection to the electric power supply network being housed inside the recess 26 in the support base from where they are routed into the service duct 40 and from here conveyed inside the building;

roofing element with devices for connection to domestic user installations inside the building: the module M incorporates inside the recess 26 or similar space in the support base and through the bottom wall 24 electric power sockets and switching devices, the electric cables for connection to the electric power supply network being housed inside the recess 26 or similar space in the support base from where they are routed into the service duct 40 and from here conveyed inside the building;

roofing element with mechanical mounting devices inside the building: the module M incorporates, on the side of the support base directed towards the inside of the building, mechanical mounting devices intended to support room furnishing or entertainment appliances or devices, and if necessary a component with a purely aesthetic furnishing function.

The functional features may be more than one for each module, for example a functional feature on the outside and a functional feature on the inside of the building.

Figure 9:
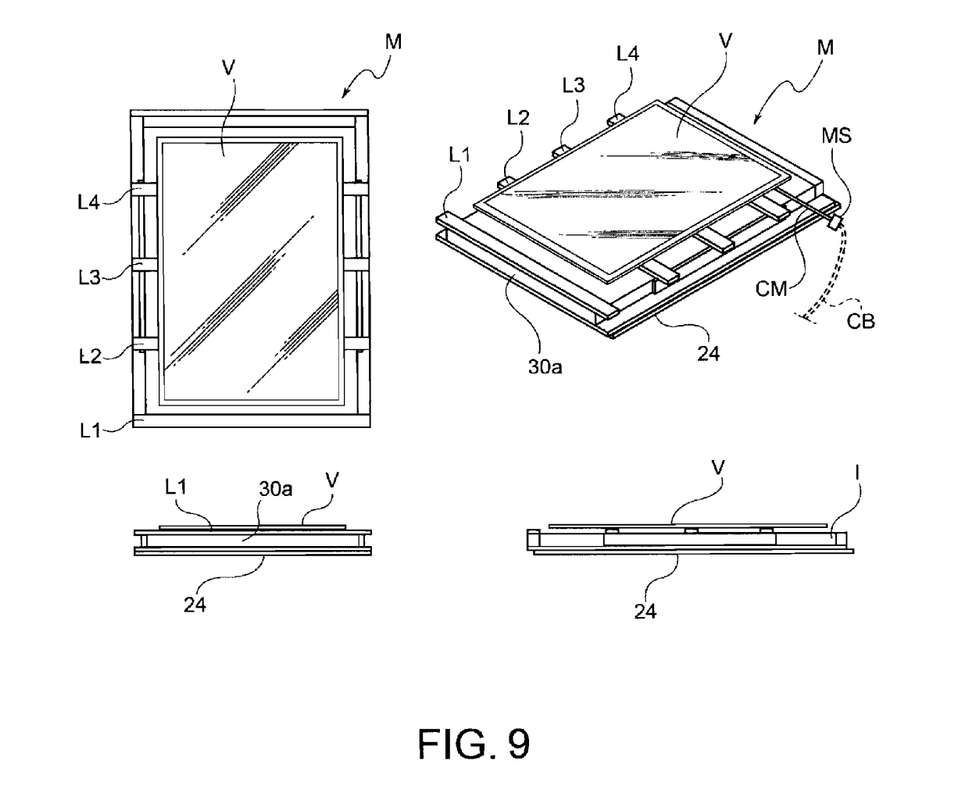
FIG. 9 is a set of views illustrating by way of example a module according to the invention functionally designed with a photovoltaic panel.

By way of example and with purely exemplary reference to the first embodiment, FIG. 9 shows a functionally designed module M with a photovoltaic panel V.

Each functionally designed module with incorporated functional elements which envisage an electrical connection with the electrical network of the building has a terminal strip MS for connecting together the wiring of the module CM, housed inside the recess 26 of the support base, and the connection cables CB routed along the service duct 40.

Similarly, each functionally designed module with incorporated functional elements which envisage a hydraulic connection with the hydraulic system of the building has a union for connecting together the pipes of the module, housed inside the recess 26 of the support base, and the connection pipes D routed along the service duct 40.

The service duct, illustrated in FIG. 9 which shows schematically the cables CB or pipes D present in the duct, is closed at the top by a joining element G in the case of a tile-shaped covering sheet or corrugated undertile sheet, while it may be simply closed by tiles in the case of a module with a top part provided with tile-holder battens.

Figure 10:
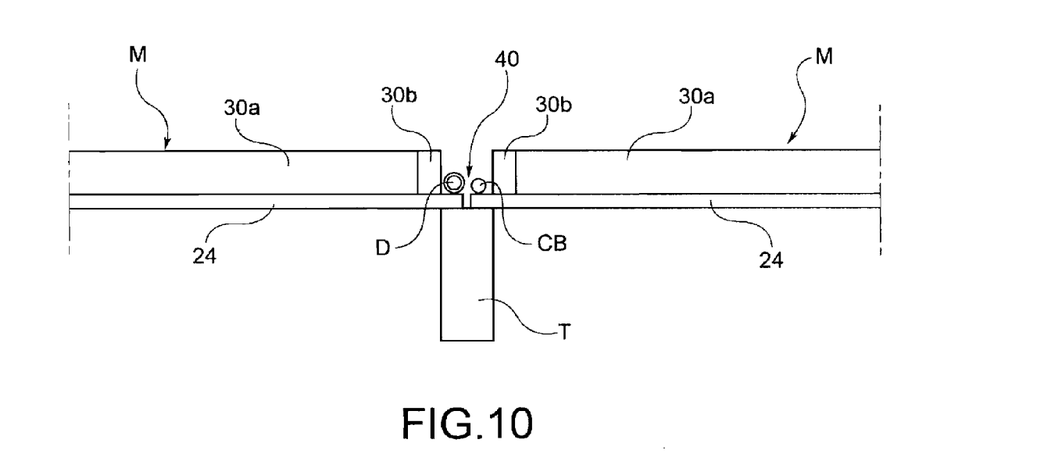
FIG. 10 is a cross-sectional view of a service duct formed between roofing modules of the system according to the invention, in a first embodiment.

The joining element G is formed as a corrugated covering portion which is designed to be arranged on-site over the lateral end zones of the corrugated covering top parts 22 of the adjacent modules, so as to provide an overall continuous aesthetic effect, as shown schematically in FIG. 10.

Figure 11:
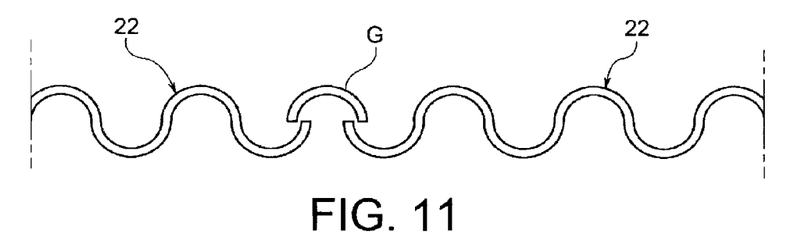
FIG. 11 is a schematic illustration of a joining element for covering a service duct in the first embodiment.

The base of the duct 40 may be conveniently lined with an insulation layer I, in the same way as the recess 26 in the support base of the module. The insulation layer I of the duct may be advantageously formed as two parts I1, I2 with shaped opposite surfaces, for example with a corrugated form, designed to define a channel for laying cables CB and pipes D, as shown in FIG. 11.

In a currently preferred variation of embodiment, shown here in FIG. 6 with purely exemplary reference to the second embodiment, the duct may be conveniently formed as a single block of insulating material 141 which is shaped so as to define the channels for laying the cables CB or pipes D for connecting the functional elements to the building installations. The union for connecting together the cables or the pipes of the functional device housed inside the module and the connection cables or pipes which are routed along the service duct 140 is provided through the sheathing, it being ensured that the assembly is sealed with the aid of accessory elements for passing through the perforated sheathing. At least one of the shoulder battens 130 may conveniently project from the profile of the insulation block 126 so as to form a seat for engaging the single block 141 forming the service duct.

The service duct, once the roof has been completed on-site, forms a recess extending from the top part of the roof (ridge) to the lower part of the roof pitch (where the gutter is fixed), so that its length is the same as the length of the roof pitch.

The roof will therefore have a plurality of service ducts or recesses which are spaced at regular intervals over the entire surface of the pitch, positioned along the support beams on which the modules rest.

The electric cables and the hydraulic pipes which converge inside the duct from the individual functional modules extend upwards along the respective duct inside which they are laid until they reach a header line running along the roof ridge underneath which they are routed horizontally so as to enter into the building from a single access point.

By way of completion of the roof area, in order to obtain the completed structure, top, lower and side "end-of-roof" terminal modules are arranged alongside the base modules described above.

The top end-of-roof module is formed as a roof ridge portion arranged above the underlying module, being able to be easily engaged with and arranged over said module.

The lower end-of-roof module may be formed as a base module which includes, preassembled, a gutter portion situated underneath the module itself, or as a base module which includes, preassembled, gutter fastening means to which the gutter will be subsequently fixed on-site, or also as a horizontal batten equipped with gutter fastening means which also acts as a support shoulder for the roofing modules. In this latter case the shape of the lower end-of-roof module depends on the shape of the horizontal lateral shoulder element defining the recess in the support base of the modules which must come into contact therewith (namely inclined or orthogonal).

The side end-of-roof module is substantially similar to the base modules, but has a greater width so that the support base of the side end-of-roof module rests on the end beam of the roof and projects from the profile of the building, itself acting as rain guard. The recess 26 in the support base, which houses the insulation layer, or the insulation block 126 in the second embodiment described, are identical to those of the base modules since the area of the support base which exceeds the dimension of the standard modules and is intended to project beyond the profile of the building does not require insulation. A vertical batten is preassembled at the side end, parallel to the vertical lateral elements defining the recess of the module, said batten acting as a stop for fixing the lateral fascia. The lateral fascia may either be fixed on-site using a conventional method or the end-of-roof module may already have, preassembled, a lateral fascia portion.

Figure 12:
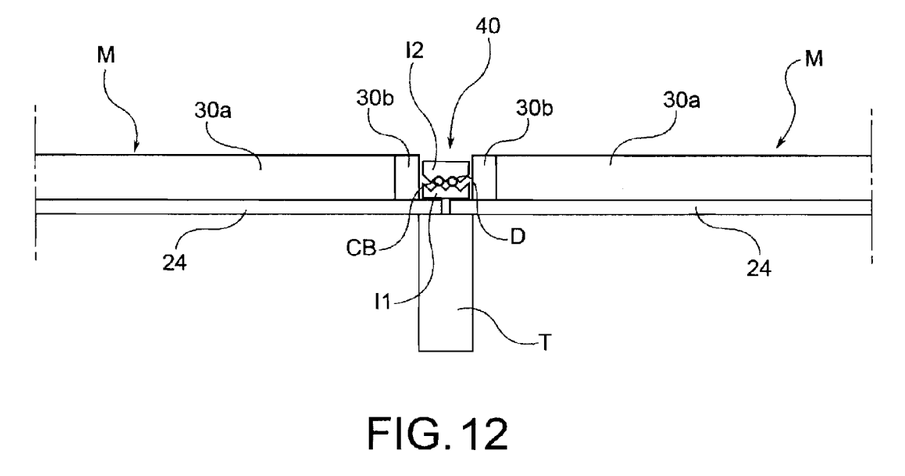
FIG. 12 is a cross-sectional view of a service duct formed between roofing modules of the system according to the invention, in a first embodiment, provided with an insulation layer.
Figure 13:
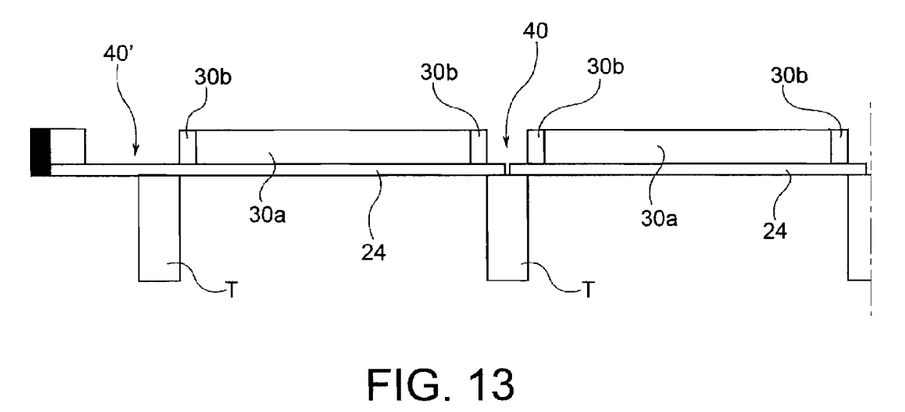
FIG. 13 is a cross-sectional view of a service duct formed in a side end-of-roof module.

The side end-of-roof module defines a lateral duct 40' which is wider than the service duct formed between adjacent standard modules owing to the greater width of the side end-of-roof module; it is bounded on one side by the vertical lateral element 30b defining the box-like recess in the module or by the corresponding shoulder batten 130 of the insulation block 126 and on the other side by the lateral fascia, as shown in FIG. 12 with reference purely by way of example to the first embodiment of the invention.

Preferably, the side and lower end-of-roof modules may be equipped with incorporated attachments or supports for safety barriers such as safety ropes (life lines) extending provisionally or permanently along the perimeter of the roof pitches.

The process for constructing a building roof using the preassembled modules according to the invention is carried out after construction on-site of the supporting structure using the conventional method and following design of the roof configuration with the aid, where necessary, of a computer.

Since the preassembled roofing modules do not have a geometrical form which can be varied depending on the building specifications, but have standard dimensions, the resultant roofing area of a building is determined by the dimensions of the modules.

Based on the specific data of the building, such as the dimension of the roof pitches, the inclination of the roof, the exposure of the building, a programmed design processor system, for example an ordinary electronic computer, is used to calculate automatically a roof geometry depending on the type of preassembled modules M.

In particular, in view of the possibility of providing a functionally designed roofing, the design system is able to propose also a guide configuration for installation of additional functions on the roofing.

The system envisages the possibility of a user being able to repeat the design calculation, while varying predetermined calculation parameters, for example so that the roof is suited as far as possible to the specific requirements.

The design system therefore performs the primary function of personalizing a roof constructed using standard products.

The system also envisages the possibility of comparing different configurations for the same building and calculating the energy efficiency of the chosen solution and data relating to any (thermal or electrical) energy production as well as the possibility of an estimate of the cost of the roofing and the laying work.

Advantageously, the system may be configured to import documents illustrating the layout and design features of buildings and export the proposed roof configuration, for example so that it may be conveniently "added" to the overall design of a building.

Once the configuration has been defined, laying of the modules on the roof begins with fixing of the lower end-of-roof module and continues with laying of the base roofing modules as far as the side and top end-of-roof modules.

On the horizontal side of each module (width of the module), the support base of each module is fitted together with or arranged next to the support base of the adjacent module. On the vertical side of each module (length of the module), the modules are arranged next to each other.

After laying of the modules, any insulation of the service duct is laid.

In the case where functionally designed modules with an electrical or hydraulic connection are present, laying of the cables or the hydraulic pipes is performed along the service duct as far as the point for connection to the electrical network or hydraulic installation of the building.

Finally, the roof covering, if it is not preassembled with the modules, is laid and any chimneys or dormer windows or other variants are provided using the conventional method, together with the fixing of fascias and gutters, if these are not present in the preassembled end-of-roof modules.

Once the roof has been completed, predetermined test procedures are carried out in order to check for correct execution of the work. In particular the electrical and hydraulic connections of the functionally designed modules are tested. As regards the functionally designed modules which have an electrical connection, once the connections have been completed, said connections are powered with a sinusoidal variable-frequency probe voltage, and measurement of the impedance provides an indication as to the correct working state of the connections and allows any damaged connection to be located. As regards the functionally designed modules which envisage a hydraulic connection, once the pipes have been laid, they are supplied with pressurized gas and measurement of the pressure drop time provides an indication of any pressure losses which can be subsequently located using a gas detector.

The main advantages of the modular roof system according to the invention, compared to the existing solutions, may be listed as follows:

Reduction in the amount of time required on-site for construction of the roof;

Less dependency on the weather conditions;

Reduction in the cost of the roof due to reduced labour costs resulting from preassembly carried out beforehand at the factory;

Increased safety on-site due to preassembly carried out beforehand at the factory;

Reduced number of contractors to be managed on-site;

Greater guarantee of meeting building construction deadlines;

Greater ease of incorporating functionally designed elements which make use of the roof surface.

Obviously, without affecting the principle of the invention, the embodiments and the constructional details may be greatly modified with respect to that described and illustrated purely by way of a non-limiting example, without thereby departing from the scope of the invention as defined in the accompanying claims.

The invention claimed is:

1. Modular roof system for a building, comprising a plurality of roofing modules in a side by side arrangement on a supporting structure, each roofing module comprising a support base resting on the supporting structure of the assembled roofing modules and a top covering part supported on said base, wherein the base of at least one of the roofing modules has at least one functional element, wherein each roofing module has interlocking joining means for joining together with adjacent modules along at least one direction of juxtaposition of the modules;

wherein the base of each of the modules comprises at least one lateral free channel connected to corresponding free channels of adjacent modules along a predetermined roof covering direction and over an entire extension of a roof pitch, the free channels and corresponding free channels being arranged side-by-side and forming a continuous service duct laterally in at least one of the adjacent modules, the service duct extending between two facing lateral elements of pairs of adjacent modules along a direction orthogonal to said predetermined roof covering direction, the service duct receiving connecting elements from said functional elements of said at least one module;

wherein the base of the module includes a bottom platform and a top insulation block receiving at least one functional element of said roofing, said block defining a free channel connectable in a side by side arrangement to a corresponding-channel defined in an adjacent module in a predetermined roof covering direction;

wherein at least two side of the module have seals extending along the length of the respective side.

2. System according to claim 1, wherein the base of the module includes a housing space designed to receive at least one functional element of said roofing, comprising first lateral elements extending along a first dimension of the module and designed to define a respective free channel extending parallel to said housing space and designed to be connected with continuity to a corresponding channel defined in the base of an adjacent module along a predetermined covering direction of the roof, and second lateral elements extending along a second dimension of the module substantially orthogonal to the first dimension and designed to define said means for joining together in an interlocking manner adjacent modules along a second direction of juxtaposition of the modules.

3. System according to claim 2, wherein said housing space is defined by a box-like structure bounded in the perimetral direction by a pair of first facing lateral elements and by a pair of second facing lateral elements adjacent to said first elements.

4. System according to claim 3, wherein said joining means defined by said lateral elements comprise a groove formed in a front element and a projection with a shape corresponding to that of said groove, formed in a rear element.

5. The modular roof system for a building according to claim 1,
wherein the insulation block has an arrangement which is offset with respect to the bottom platform which defines said interlocking joining means.

6. The modular roof system for a building according to claim 5, wherein the insulation block of a module projects with respect to the bottom platform on two adjacent sides of the module along a first and a second orthogonal direction of juxtaposition of the modules, wherein a module is joined to the adjacent modules by insertion of the module's platform underneath the insulation block of two first modules adjacent along both the directions of juxtaposition of the modules and by mounting the insulation block above the platform of two adjacent modules adjacent along both the directions of juxtaposition of the modules.

7. The modular roof system for a building according to claim 1, wherein at least one functional element of said roofing is a device consisting of one or more of illuminating devices, energy production devices, surveillance devices, communication devices, environmental control devices, domestic user installation devices, mechanical mounting devices and furnishing elements.

8. The modular roof system for a building according to claim 7, wherein said device is exposed to the outside of the building and forms said top covering part.

9. The modular roof system for a building according to claim 7, wherein said device is exposed to the inside of the building, so that the base of the module is passed through by the device to allow exposure of the device inside the building.

10. The modular roof system for a building according to claim 1, wherein a service duct is formed by at least one free channel extending parallel to a pair of adjacent modules and receiving elements connecting the functional element of at least one of said modules to a building installation.

11. The modular roof system for a building according to claim 10, wherein the service duct includes insulation at least partially retaining and surrounding the elements connecting the functional devices routed along the service duct.

12. The modular roof system for a building according to claim 11, wherein a service channel is formed by the juxtaposition of a plurality of modules from a gutter line to a roof ridge, extends in a predetermined covering direction of the roof and merges into a header channel running along the roof ridge.

13. The modular roof system for a building according to claim 1, wherein the top covering part of the module is a shaped covering sheet.

14. The modular roof system for a building according to claim 1, wherein the top covering part of the module includes a plurality of parts, wherein one of the plurality of parts comprises a plurality of battens which support roof covering articles.

\* \* \* \* \*